(12) United States Patent
Wieczorek

(10) Patent No.: US 11,377,028 B2
(45) Date of Patent: Jul. 5, 2022

(54) DETECTION SYSTEM AND A VEHICLE THEREWITH

(71) Applicant: MOTHERSON INNOVATIONS COMPANY LIMITED, London (GB)

(72) Inventor: Romeo Wieczorek, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 37 days.

(21) Appl. No.: 17/025,652

(22) Filed: Sep. 18, 2020

(65) Prior Publication Data
US 2021/0086692 A1    Mar. 25, 2021

(30) Foreign Application Priority Data

Sep. 20, 2019    (DE) .................... 10 2019 125 429.9

(51) Int. Cl.
*B60R 1/00*    (2006.01)
*G06K 9/00*    (2006.01)
(Continued)

(52) U.S. Cl.
CPC ............ *B60R 1/00* (2013.01); *G06K 9/00791* (2013.01); *G06K 9/209* (2013.01); *G06K 9/2018* (2013.01);
(Continued)

(58) Field of Classification Search
CPC ... B60R 1/00; B60R 2300/10; B60R 2300/20; B60R 11/04; G01S 17/931; G01S 7/4816; G02B 5/208; G02B 13/14; G03B 11/00; G06K 9/00791; G06K 9/2018; G06K 9/209; G06K 9/6201; H04N 5/2354; H04N 5/332; H04N 5/445
See application file for complete search history.

(56) References Cited

U.S. PATENT DOCUMENTS

| 2007/0200064 A1* | 8/2007 | Remillard | .............. G02B 23/12 |
| | | | 250/330 |
| 2013/0250103 A1* | 9/2013 | Lu | ........................ H04N 5/2258 |
| | | | 348/143 |

(Continued)

FOREIGN PATENT DOCUMENTS

JP    2010-245846 A    10/2010

OTHER PUBLICATIONS

German Office Action dated Apr. 17, 2020 of German application No. DE 102019125429.9.

*Primary Examiner* — Dakshesh D Parikh
(74) *Attorney, Agent, or Firm* — Jones Day

(57) ABSTRACT

A detection system for vehicles adapted to record objects within a scenery at least in problematic viewing conditions includes a camera system establishing an optical path from a light entrance aperture via a lens system to an image recording unit with the image recording unit being adapted to record visible and IR light one or more of reflected or emitted from the scenery comprising at least one object, an IR filter arranged within the optical path to block at least a first part of the IR light not being the at least one object related from reaching the image recording unit, and a conversion filter arranged within the optical path to convert at least a second part of the IR light being the at least one object related to visible light of an image enhancing wavelength range.

13 Claims, 3 Drawing Sheets

(51) Int. Cl.
*G06K 9/20* (2006.01)
*G06K 9/62* (2006.01)
*H04N 5/235* (2006.01)
*H04N 5/445* (2011.01)
*G02B 5/20* (2006.01)

(52) U.S. Cl.
CPC ......... *G06K 9/6201* (2013.01); *H04N 5/2354* (2013.01); *H04N 5/445* (2013.01); *B60R 2300/10* (2013.01); *B60R 2300/20* (2013.01); *G02B 5/208* (2013.01)

(56) References Cited

U.S. PATENT DOCUMENTS

| | | | |
|---|---|---|---|
| 2014/0111652 A1* | 4/2014 | So | H04N 5/374 348/164 |
| 2016/0091367 A1* | 3/2016 | Micheels | G01J 3/108 250/339.07 |
| 2019/0006406 A1* | 1/2019 | Ozawa | H04N 9/04559 |
| 2019/0179138 A1* | 6/2019 | Koller | F21S 41/675 |
| 2021/0118928 A1* | 4/2021 | Sayama | H01L 27/14621 |

* cited by examiner

DETECTION SYSTEM AND A VEHICLE THEREWITH

CROSS-REFERENCE TO RELATED APPLICATION

This application claims the benefit of foreign priority to German Patent Application No. DE 10 2019 125 429.9, filed on Sep. 20, 2019, which is hereby incorporated by reference in its entirety for all purposes.

BACKGROUND

1. Field of the Invention

The present disclosure relates to a detection system and a vehicle therewith. In detail, the usage of an infrared (IR) camera with an electrically controllable IR filter for improved detection of objects in an area and a RCCB chip is described.

2. Related Art

In the future, autonomous vehicles will have to function according to certain rules. The car must quickly decide whether or not to avoid an obstacle on the road. In order to make this decision, the object must be clearly recognized under all circumstances. Very problematic for recognition systems are darkness, fog and back light.

DE 10230639 disclose an illumination system for a road vehicle having IR headlamps in the front of the vehicle, illuminating a patch on the road. An IR camera is mounted on the roof of the vehicle and is connected to a color video monitor inside the vehicle. The monitor is mounted in front of the driver's seat and can give a false color picture of the road and obstacles ahead.

DE 10201105628 disclose a system for supporting a driver's vision to display a night image in color image quality required to detect a pedestrian and to display a road image required to alert a deviation from the road using a single camera module comprising a camera module, a signal extraction unit, a road image data generating unit, a pedestrian image data generating unit and a display driver unit.

EP 1465002 disclose an arrangement having an infrared radiation source for illuminating the vehicle's surroundings, an infrared sensitive camera for detecting at least part of the illuminated surroundings, an infrared filter and a display for representing the image information recorded by the camera. The filter has areas with different transmission characteristics, at least one transmissive for visible light or parts thereof.

In the U.S. Pat. No. 9,131,120, which relates generally to vision systems for vehicles and, more particularly, to rear-view vision systems which provide the vehicle operator with scenic information in the direction rearward of the vehicle, multiple cameras are disclosed. However, a long-felt need in the art of vehicle vision and detection systems is to reduce the cost, and indirectly the amount of cameras used, and increase the efficiency regarding any gathering of information of the condition around the vehicle in order to safely carry out safe autonomous driving.

Documents WO 2011/066396, WO 2011/149960, WO 2012/118528, WO 2012/118529, WO 2012/170456, WO 2013/003850 and WO 2013/028232 describe organic IR up-conversion devices with IR-sensitive organic layer serve as a charge generation transport layer in the OLED structure for IR imaging and vision devices.

It would therefore be desirable to have a detection system which reduces costs and is more efficient than those disclosed in the prior art.

SUMMARY

In an aspect, a detection system for vehicles adapted to record objects within a scenery at least in problematic viewing conditions is provided. The aforementioned detection system comprises a camera system establishing an optical path from a light entrance aperture via a lens system to an image recording unit, with the image recording unit being adapted to record visible and IR light reflected and/or emitted from the scenery comprising at least one object. The detection system further comprises an IR (infrared) filter arranged within the optical path to block at least a first part of the IR light not being object related from reaching the image recording unit, and a conversion filter arranged within the optical path to convert at least a second part of the IR light being object related to visible light of an image enhancing wavelength range. The lens system comprises at least one lens arranged in front of the image recording unit to guide the light from the scenery through the IR and conversion filters to the image recording unit.

While cameras mainly work well in visible light in good visibility conditions, significantly better results can be achieved if the IR range is included, especially in poor visibility conditions such as rain, fog, twilight or at night. The evaluation of camera images in the 750 nm-1400 nm range is independent of daylight and can achieve very good results even in fog. Furthermore, it makes sense to do everything with one camera to provide a compact system, which can be operated easily. For this purpose, an IR filter is used which can be switched off electrically with the fastest possible switching times. The invention provides a superposition of the images of visible light and IR light on the same chip and an evaluation of them together in real time. Additionally, transparent pixels (RCCB) could bring further brightness advantages.

Different infrared image sensors work for the first aspect of the invention. Silicon sensors are used for very short wavelengths around 800 nm. They convert the photons directly into a photocurrent via the photoelectric effect. For wavelengths from 1 to 2 µm (SWIR), indium gallium arsenide sensors (InGaAs) or lead sulfide sensors are used. In the wavelength range 3-5 (MWIR) mainly indium antimony detectors (InSb) and cadmium mercury telluride detectors (MCT) are used. A cold filter limits the wavelength downwards. Indium antimony detectors with corresponding cold filters offer a sensitive spectral range from 1 to 5 µm. For the long wavelength range from 8 to 14 µm (LWIR), gallium arsenide quantum well detectors (QWIP) and cadmium mercury telluride detectors are frequently used. Microbolometer arrays that detect radiation by heating a sensor element are also well suited for this wavelength range. Common materials for microbolometer arrays are vanadium oxide (VOx) or amorphous silicon (a-Si). When the fog can be seen as small drops of water, the IR radiation through water can be taken. One distinguishes between NIR and MIR, the limit is 1400 nm. The limit at 1400 nm is due to the fact that above this value the absorption of infrared rays by water increases significantly, which is why it defined as the range of spectrum herein.

In an embodiment of the first aspect of the invention the conversion filter is an up conversion layer structure converting the IR light into visible light of a certain wavelength comprising an IR absorbing layer followed by a stack of layers arranged between electrodes with the conversion filter being adapted to be operated by a suitable operating voltage to enable the up conversion. The conversion filter can be a LED or organic LED with state of the art layer stacks, whereby an additional IR absorbing layer is arranged between the hole blocking layer (HBL) and the hole transfer layer (HTL). Said IR absorbing layer can be a PbS QD IR absorbing layer. The IR absorbing layer is activated when an operating voltage (uneven zero) is applied. The conversion filter may therefore be a switchable filter in order to transmit the IR light to the image recording unit in an off state and to convert the IR light to the image enhancing wavelength range in an on state.

The filter technology switches the IR image alternately on and off with a defined repetition rate. This allows the IR and visible images to be transmitted alternately in a ratio of 1:1. In twilight conditions, the ratio of the refresh rate can be changed from 1:1. In light darkness, the ratio IR to visible could be e.g. 1:4 and then, depending on the twilight, revert in the direction of 1:1. The filter frequency (or switching ratio) for switching must be at least the image repetition frequency of the chip (image recording unit). In addition, an external light source, e.g. in the front headlight, can emit an IR light source with e.g. 1050 nm. Both the front area and the front/side area should be illuminated. With this, better results with the IR filter in the NIR range can be achieved. A synchronization with the frequency of the conversion filter is also possible, so that the IR illuminator only emits light when the IR conversion filter is active (e.g. 30 Hz or 60 Hz etc.).

In another embodiment, the conversion filter may be switched on and off with a ratio between the on and off durations varying between 1:1 and 1:4. Alternatively, the ratio of 1:1 which is applied in twilight conditions, may increase when viewing conditions improve.

In an embodiment, the IR filter is arranged on top of the image recording unit and the conversion filter is arranged on top of the IR filter and the lens system is arranged in front of the set of image recording unit, IR filter and conversion filter. The infrared filter or cut-off filter is a conventional filter that simply filters out/cuts infrared light. This filter is used to avoid color falsifications in the camera image. In state of the art, the IR filter is normally arranged on the lens. However, according to state of art arrangements, no IR light would arrive on the conversion filter of the invention and the IR filter is ineffective.

Therefore, the IR filter is placed behind the conversion layer, i.e. closer to the chip than the conversion layer. Then the following effect occurs: If the layer is switched on, it converts the IR light into a different wavelength range (e.g. green light), and the IR filter lets the additional light pass through. If the conversion layer is switched off, all the light comes through, including IR, and is then filtered in the IR filter so that no color falsifications occur, as with the conventional method.

In an alternative embodiment, the conversion filter is arranged on top of the image recording unit and the IR filter is arranged within the optical path in front of the conversion filter with the IR filter having a transmission window of a certain widths outside the first part of the IR light in order to transmit the second part of the IR light to the conversion filter. For example, the IR filter may be applied on top of at least one lens of the lens system or may be arranged between the image recording unit and one lens of the lens system or between two lenses of the lens system. Another way to make an IR filter permeable again is for a very narrow IR band. So far only IR filter that cuts everything from 750 nm are mentioned. This embodiment relates to an IR filter that cuts everything from 750 nm but lets a small band pass at 1050 nm. This small band doesn't falsify the colors so much, and can be corrected with software. In this case the conversion layer (filter) has to be designed exactly for the wavelength (e.g. 1050 nm) that the IR filter lets through. Now the IR filter can be again arranged in the lens, because of the band on the conversion filter.

In an additional embodiment, the conversion filter and the IR filter are arranged in the optical path with the conversion filter being arranged in front of the IR filter along the optical path. Further, at least one of IR filter or conversion filter is applied on top of at least one lens of the lens system or at least one of IR filter or conversion filter is arranged between two lenses of the lens system or between the image recording unit and one lens of the lens system. The second part of the IR light may comprise 1050 nm.

In another embodiment, the visible light is divided into a first, a second and a third wavelength range and the image recording unit comprises at least three segments with a first segment being adapted to record only the first wavelength range of the visible light, a second segment being adapted to record only the second wavelength range of the visible light and the third segment being adapted to record all wavelength ranges of the visible light. In order to match the IR and visible images a problem arises: the IR image should only be inserted into the optical image for relevant parts. To make such a matching the object has to be evaluated before it can be inserted. Otherwise the driver has a pure IR image in front of him. In a solution provided by the present invention, the IR image is evaluated so that only objects moving relative to the road are fixed and the matching is included. Standing creatures or objects running away are not considered. In the second step, the object made visible is transferred into the visible image. The filter used may have a preferred color, which can be green.

In the aforementioned embodiment, further light improvement by transparent pixel, e.g. a RCCB chip is provided, where "R" denotes a red filtered segment, "B" denotes a blue filtered segment and "C" denotes non-filtered segments. Hereby C=transparent pixel green is omitted and can be calculated. Her, the color "green" is just an example and can be also any other colors with correspondingly selected different colored filter segments. In the transparent pixel falls now with switched on filter the light intensity of IR converted into green still with pure. Thus this pixel gets about 4 times the light as if it were only green. The contents can be reverse calculated again.

Filter is on: $C(t1)=G+IR+R+B+(-R-B)=GAR$ $C(t1)$ as transparent pixel at time tl: here the data can be subtracted from the red and blue pixel and only green and the infrared light converted to green light remains.

Filter is off: $C(t2)=G+R+B+(-R-B)=G$ $C(t2)$ as transparent pixel at time t2: Here the green parts of the visible light can be distinguished from the converted infrared light, which also appears as green.

Since the filter is switched off and on x times per second, with x element of the natural numbers the information of C at the position t1 and at the position t2 are known and can thus distinguished from additional information in the green, whether it is IR light or real green. Thus, the image can be processed in such a way that it is appealing to the human eye and only the IR information that could be a danger at night are displayed. The above mentioned concept can also be applied for instance with GCCB, GCCR chips, where $C(t1)$ results in R+IR or B+IR respectively and $C(t2)$ results in R or B respectively.

In an embodiment of the RCCB chip (or GCCB or GCCR chip) mentioned above, the different segments of the image recording unit have same sizes. The image recording unit may also comprise four rectangular segments arranged in a 2×2 array where the first and second segments as well as the third segment and a fourth segment are diagonally arranged, where the third and fourth segments are identical segments. Further, the image enhancing wavelength range may be within the third wavelength range.

In another embodiment, the image recording unit is adapted to record the first wavelength range of the visible light of the first segment and the second wavelength range of the visible light with the second segment and a sum of the wavelength ranges including the first and second wavelength ranges and additionally the third wavelength range with at least the third segment, with a difference between the intensities of the third segment minus the intensities of the first and second segment resulting in intensity of visible light in the third wavelength range in the off-state of the conversion filter or in the sum of the intensities of the third wavelength range provided by the object and provided by the conversion filter. This lead to more efficiency in the detection system and correlate to the equations mentioned above.

The detection system according to one above mentioned embodiments can further comprise an image matching unit adapted to compare the images recorded in an on state of the conversion filter with images recorded in an off state of the conversion filter, with critical objects being distinguished from non-critical objects and/or identified by comparing a contrast between both images, with preferably objects moving relative to a moving direction of the vehicle showing less contrast in the image with the off state of the conversion filter when being compared. How can one tell if an object is difficult or impossible to see with the naked eye? If one compares the IR image with the visible image, the object moving towards the relevant roadway must be significantly less in number of pixels (contrast) than that of the IR image. If such an object can be detected, it is faded in from the IR image into the visual image. The advantage herein lies: only objects in the IR range are made visible which also represent a latent danger and no arbitrary wild animals in the forest which simply only graze near the road. Also, a square can be drawn around the object made visible by IR to identify the object that is difficult or impossible to see with the naked eye. Therefore, the image matching unit may transfer the identified objects to the visible image in order to tag the critical objects and/or to inform a viewer about present critical objects or even have the image matching unit further displaying a frame around each of the tagged objects to enhance the present critical object in the visible image.

In another aspect, a vehicle, comprising the detection system according to the first aspect of the invention is provided. Said vehicle may comprise an IR light source to illuminate a scenery, at least in problematic viewing conditions. Alternative to active lighting residual heat detection can also be used. Vehicles might be any fast moving vehicles such as motor driven vehicles like cars, trucks, motor bicycles etc.

The active illumination by an infrared LED, which can be used e.g. in a high beam illuminator, is state of the art. It illuminates objects that are further away and can thus receive reflections that make objects appear at night. In order to avoid invisible glare, high beam headlights and IR luminaires have to beam in exactly the same direction, or intelligent lighting has to be used in which headlights change direction in oncoming traffic to avoid glare. Using residual heat detection is no longer in the area of active lighting. Night vision devices working according to the principle of a thermal imaging camera are sensitive to the thermal radiation of the objects themselves. They work with pyroelectric or bolometer arrays (Focal Plane Array). The devices are considerably more expensive and are used, for example, in the search for missing persons or by the military. The devices have lenses made of monocrystalline germanium and can also be used during the day. The latest permitted variant for civilian use in night vision devices (service life approx. 15,000 hours) is a further improvement of these devices working with microchannel plates. Here, the sensitive chemical gallium arsenide (GaAs) is additionally used, which achieves up to 50,000 times the light amplification.

Filter technology in front of conventional cameras in the range greater than 1000 nm.

Advantages of filter technology in front of a normal camera: dual use visible and IR (UV-VIS-SWIR) high resolution low cost imaging sensors and from the aspects of the present invention. In an embodiment of the second aspect of the invention, the IR light source emits light of at least 1050 nm, which advantages have been described in the first aspect of the invention.

In another embodiment of this aspect, the IR light source may be switched on and off with a frequency correlating to a switching frequency of the conversion filter. The advantage herein correlates to the advantages described in the first aspect of the invention.

In another embodiment, the IR light source is integrated at least into a front light assembly of the vehicle. This is desirable as the drive direction of vehicles is mostly frontal. However, also rear light assemblies may comprise an IR light source.

In an embodiment, the vehicle further comprises a display unit for viewing the image provided by the camera system. The driver can therefore also see the critical object in a foggy scenery.

BRIEF DESCRIPTION OF THE DRAWINGS

The above listed embodiments can be used individually or in any combination to provide the device and the process in accordance with the invention. These and other aspects of the invention are shown in detail in the schematic illustrations as follows.

DETAILED DESCRIPTION

Figure 1:
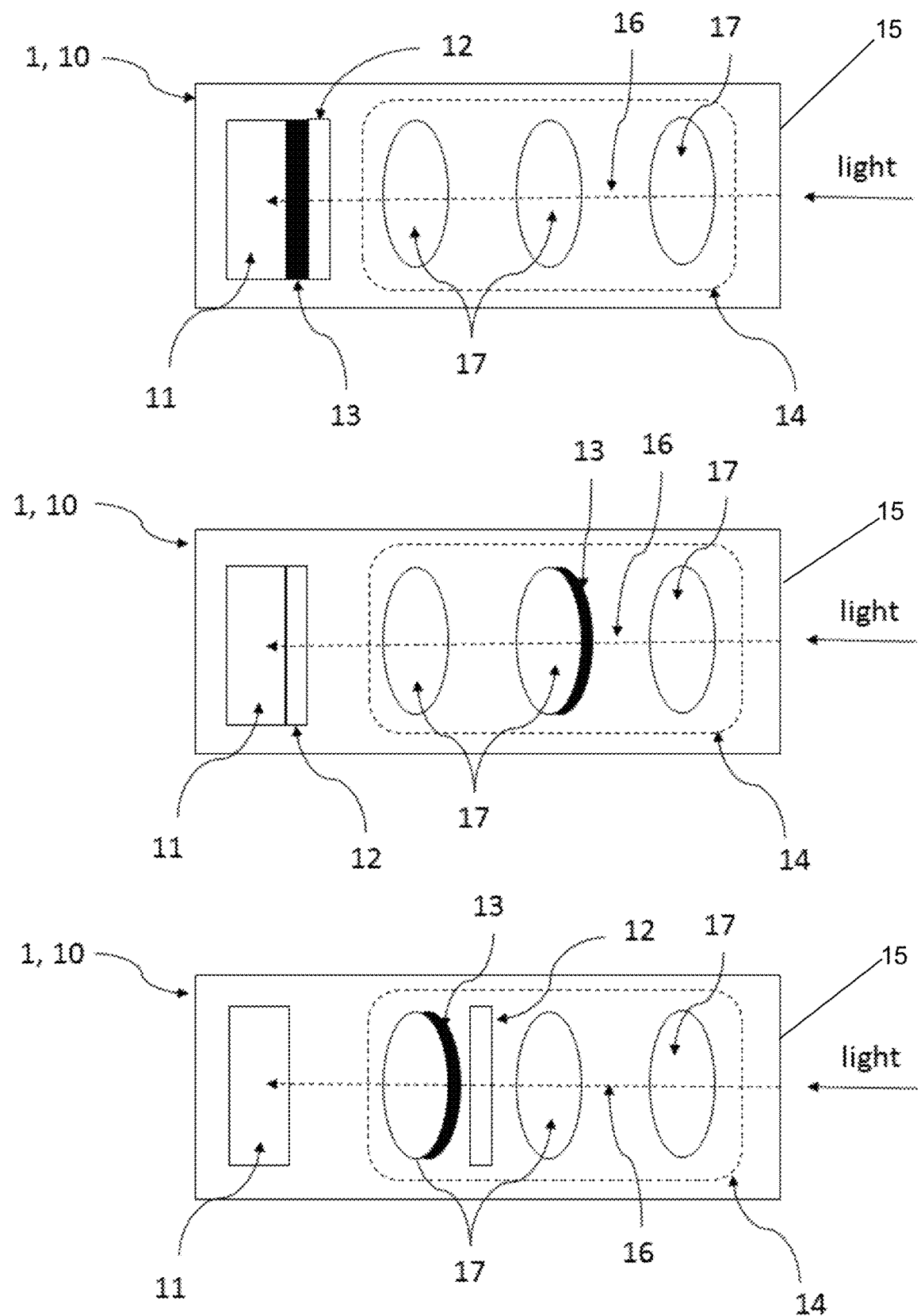
FIG. 1 depicts a camera system of a detection system according to the invention, with three different arrangements of in particular an IR filter.

FIG. 1 shows a camera system 10 of a detection system 1 for vehicles 40 adapted to record objects within a scenery at least in problematic viewing conditions is provided. The camera system 10 establishes an optical path 16 from a light entrance aperture 15 via a lens system 14 to an image recording unit 11, whereby the image recording unit 11 is adapted to record visible and IR light reflected and/or emitted from the scenery comprising at least one object 50 (see FIG. 4). The detection system 1 further comprises an IR (infrared) filter 13 arranged within the optical path 16 to block at least a first part of the IR light not being an object 50 related from reaching the image recording unit 11, and a conversion filter 12 is arranged within the optical path 16 to convert at least a second part of the IR light being object related to visible light of an image enhancing wavelength range. The lens system 14 comprises at least one lens 17 arranged in front of the image recording unit 11 to guide the light from the scenery through the IR and conversion filter 12 to the image recording unit.

In the top of FIG. 1, the IR filter 13 is arranged on top of the image recording unit 11 and the conversion filter 12 is arranged on top of the IR filter 13 and the lens system is arranged in front of the set of image recording unit, IR filter 13 and conversion filter. The infrared filter or cut-off filter is a conventional filter that simply filters out/cuts infrared light. This filter is used to avoid color falsifications in the camera image. In state of the art, the IR filter 13 is normally arranged on the lens. However, according to state of art arrangements, no IR light would arrive on the conversion filter 12 of the invention and the filter is ineffective.

Therefore, the IR filter 13 is placed behind the conversion layer, i.e. closer to the chip than the conversion layer. Then the following effect occurs: If the layer is switched on, it converts the IR light into a different wavelength range (e.g. green light), and the IR filter 13 lets the additional light pass through. If the conversion layer is switched off, all the light comes through, including IR, and is then filtered in the IR filter 13 so that no color falsifications occur, as with the conventional method.

In the middle of FIG. 1, the conversion filter 12 is arranged on top of the image recording unit 11 and the IR filter 13 is arranged within the optical path in front of the conversion filter 12 whereby the IR filter 13 has a transmission window of a certain widths outside the first part of the IR light in order to transmit the second part of the IR light to the conversion filter. For example, the IR filter 13 may be applied on top of at least one lens of the lens system or may be arranged between the image recording unit 11 and one lens of the lens system or between two lenses of the lens system. Another way to make an IR filter 13 permeable again is for a very narrow IR band. So far only IR filter 13 that cuts everything from 750 nm are mentioned. This embodiment relates to an IR filter 13 that cuts everything from 750 nm but lets a small band pass at 1050 nm. This small band doesn't falsify the colors so much, and can be corrected with software. In this case the conversion layer (filter) has to be designed exactly for the wavelength (e.g. 1050 nm) that the IR filter 13 lets through. Now the IR filter 13 can be again arranged in the lens, because of the band on the conversion filter.

In the bottom of FIG. 1, the conversion filter 12 and the IR filter 13 are arranged in the optical path where the conversion filter 12 is arranged in front of the IR filter 13 along the optical path. Further, at least one IR filter 13 or conversion filter 12 are applied on top of at least one lens 17 of the lens system 14 or at least one of IR filter 13 or conversion filter 12 is arranged between two lenses 17 of the lens system 14 or between the image recording unit 11 and one lens 17 of the lens system 14. The second part of the IR light may comprise 1050 nm.

The conversion filter 12 can be an up conversion layer structure converting the IR light into visible light of a certain wavelength comprising an IR absorbing layer followed by a stack of layers 21-27 arranged between electrodes where the conversion filter 12 is adapted to be operated by a suitable operating voltage to enable the up conversion.

Figure 2:
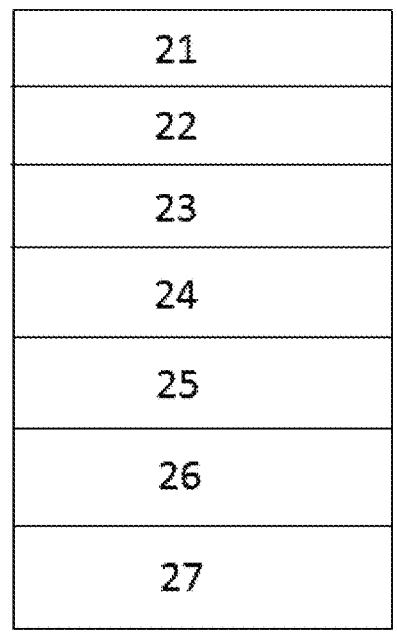
FIG. 2 shows an LED structure with IR absorbing layer to establish a conversion filter.

FIG. 2 shows that the conversion filter 12 can be a LED or organic LED 20 with state of the art layer stacks (anode layer 21, hole blocking layer (HBL) 22, hole transport layer (HTL) 24, light emission layer (EML) 25, electron transport layer (ETL) 26 and cathode layer 27), whereby an additional IR absorbing layer 23 is arranged between the hole blocking layer 22 and the hole transfer layer 24. Said IR absorbing layer 23 can be a PbS QD IR absorbing layer. The IR absorbing layer 23 is activated when an operating voltage (uneven zero) is applied. The conversion filter 12 may therefore be a switchable filter in order to transmit the IR light to the image recording unit 11 in an off state and to convert the IR light to the image enhancing wavelength range in an on state.

In another embodiment of the first aspect of the invention, the visible light is divided into a first, a second and a third wavelength range and the image recording unit 11 comprises at least three segments 31, 32, 33 where a first segment 31 is adapted to record only the first wavelength range of the visible light, where a second segment 32 is adapted to record only the second wavelength range of the visible light and the third segment 33 is adapted to record all wavelength ranges of the visible light. In order to match the IR and visible images a problem arises: the IR image should only be inserted into the optical image for relevant parts. To make such a matching the object has to be evaluated before it can be inserted. Otherwise the driver has a pure IR image in front of him. In a solution provided by the present invention, the IR image is evaluated so that only objects moving relative to the road are fixed and the matching is included. Standing creatures or objects running away are not considered. In the second step, the object made visible is transferred into the visible image. The filter used may have a preferred color, which can be green.

Figure 3:
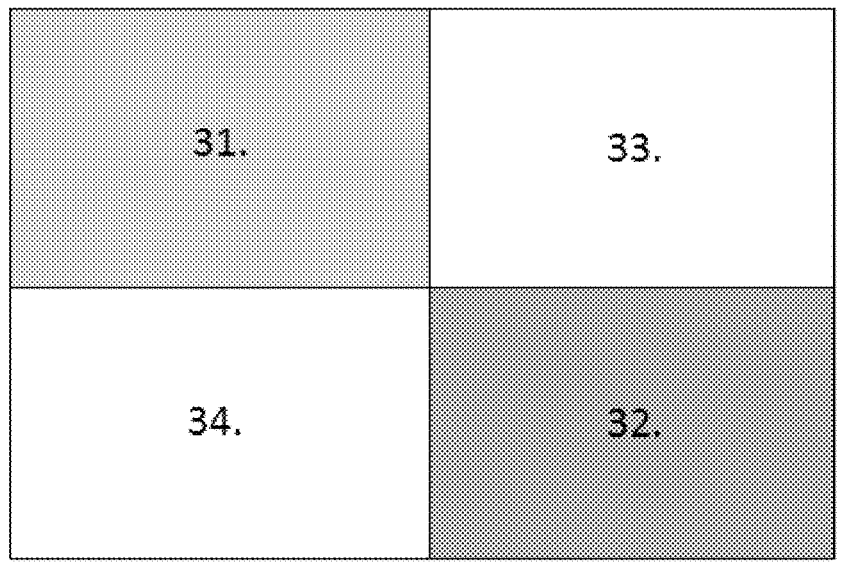
FIG. 3 shows an image recording unit as a schematic RCCB chip with corresponding segments.

FIG. 3 shows a RCCB chip where the different segments of the image recording unit 11 have identical sizes. The image recording unit 11 may also comprise four rectangular segments 31, 32, 33, 34 arranged in a 2×2 array where the first and second segment 31, 32 as well as the third segment 33 and a fourth segment 34 are diagonally arranged, where the third and fourth segment 33, 34 are identical segments. Further, the image enhancing wavelength range may be within the third wavelength range. The first segment 31 may comprise a red filter to only pass red light for being detected by this segment 31 of the RCCB chip, while the second segment 32 may comprise a blue filter to only pass blue light for being detected by this segment 32 of the RCCB chip.

In another embodiment of the first aspect of the invention, the image recording unit 11 is adapted to record the first wavelength range of the visible light of the first segment 31 and the second wavelength range of the visible light with the second segment 32 and a sum of the wavelength ranges including the first and second wavelength ranges and additionally the third wavelength range with at least the third segment 33 (and also fourth segment 34), where a difference between the intensities of the third segment 33 minus the intensities of the first and second segment 31, 32 result in intensity of visible light in the third wavelength range in the off-state of the conversion filter 12 or in the sum of the intensities of the third wavelength range provided by the object 50 and provided by the conversion filter 12.

In the aforementioned embodiment, further light improvement by transparent pixel e.g. a RCCB chip 12 is provided. Hereby C=transparent pixel green is omitted and can be calculated. In the transparent pixel falls now with switched on filter the light intensity of IR converted into green still with pure. Thus this pixel gets about 4 times the light as if it were only green. The contents can be reverse calculated again.

Filter is on: C(t1)=G+IR+R+B+(−R−B)=G+IR

C(t1) as transparent pixel at time t1: here the data can be subtracted from the red and blue pixel and only green and the infrared light converted to green light remains.

Filter is off: C(t2)=G+R+B+(−R−B)=G

C(t2) as transparent pixel at time t2: Here the green parts of the visible light can be distinguished from the converted infrared light, which also appears as green.

Since the filter is switched off and on x times per second, with x element of the natural numbers the information of C at the position t1 and at the position t2 are known and can thus distinguished from additional information in the green, whether it is IR light or real green. Thus, the image can be processed in such a way that it is appealing to the human eye and only the IR information that could be a danger at night are display 42ed.

The filter technology switches the IR image alternately on and off with a defined repetition rate. This allows the IR and visible images to be transmitted alternately in a ratio of 1:1. In twilight conditions, the ratio of the refresh rate can be changed from 1:1. In light darkness, the ratio IR to visible could be e.g. 1:4 and then, depending on the twilight, revert in the direction of 1:1. The filter frequency (or switching ratio) for switching must be at least the image repetition frequency of the chip (image recording unit). In addition, an external light source 41, e.g. in the front headlight, can emit an IR light source 41 with e.g. 1050 nm. Both the front area and the front/side area should be illuminated. With this, better results with the IR filter 13 in the NIR range can be achieved. A synchronization with the frequency of the conversion filter 12 is also possible, so that the IR illuminator only emits light when the IR conversion filter 12 is active (e.g. 30 Hz or 60 Hz etc.).

The detection system 1 according to one above mentioned embodiments can further comprise an image matching unit 43 adapted to compare the images recorded in an on state of the conversion filter 12 with images recorded in an off state of the conversion filter, where critical objects 50 are distinguished from non-critical objects and are therefore identified by comparing a contrast between both images, where objects 50 moving relative to a moving direction of the vehicle 40 show less contrast in the image with the off state of the conversion filter 12 when being compared. How can one tell if an object is difficult or impossible to see with the naked eye? If one compares the IR image with the visible image, the object moving towards the relevant roadway must be significantly less in number of pixels (contrast) than that of the IR image. If such an object can be detected, it is faded in from the IR image into the visual image. The advantage herein lies: only objects in the IR range are made visible which also represent a latent danger and no arbitrary wild animals in the forest which simply only graze near the road. Also, a square can be drawn around the object made visible by IR to identify the object that is difficult or impossible to see with the naked eye Therefore, the image matching unit may transfer the identified objects to the visible image in order to tag the critical objects informing a viewer about present critical objects or even have the image matching unit further display 42ing a frame around each of the tagged objects to enhance the present critical object in the visible image.

Figure 4:
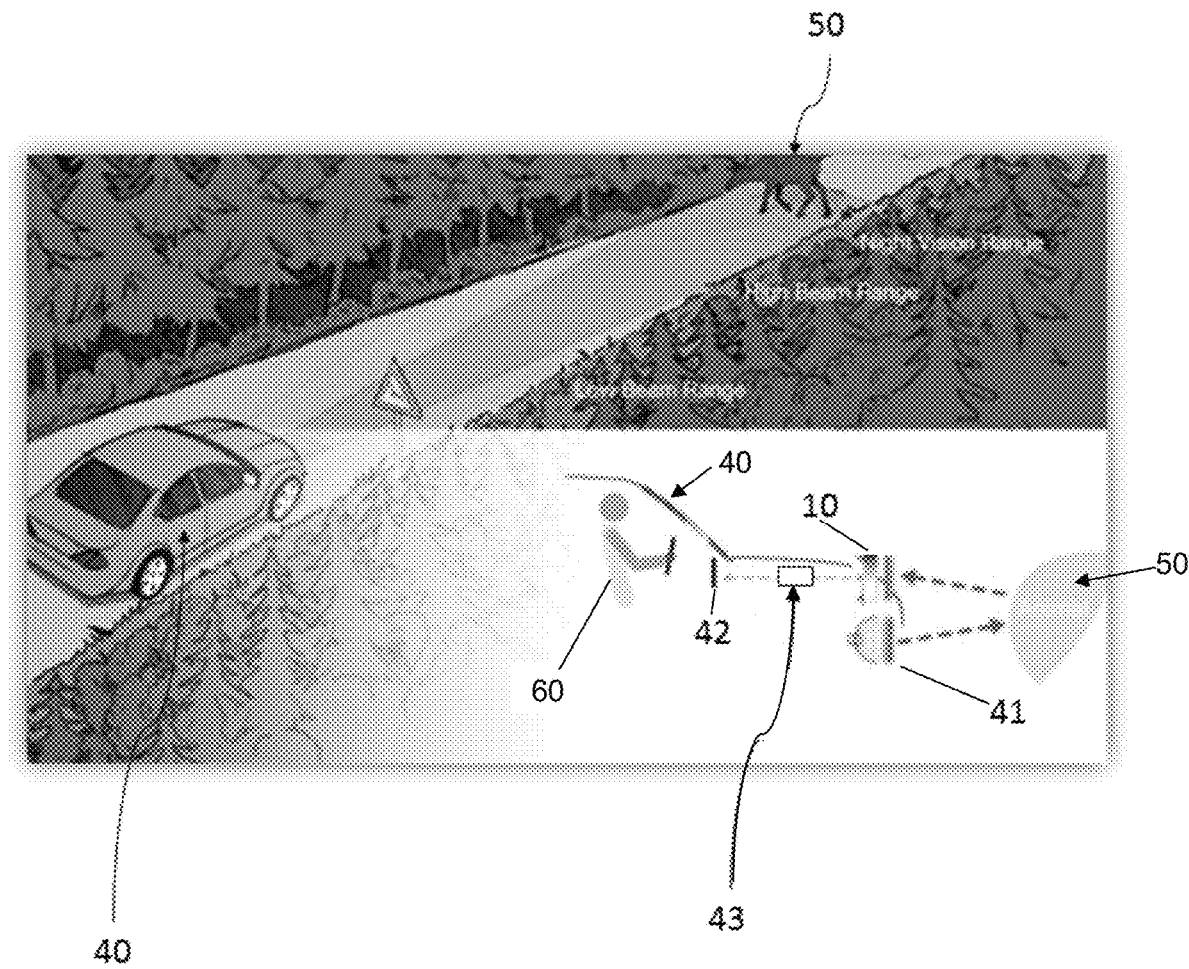
FIG. 4 shows a vehicle according to the invention.

FIG. 4 shows a vehicle 40 comprising the detection system 1 according to the invention to inform the driver 60 of the vehicle 40 about critical objects 50. Said vehicle 40 comprises an IR light source 41 to illuminate a scenery, at least in problematic viewing conditions. Alternative to active lighting residual heat detection can also be used. The IR light source 41 may be switched on and off with a frequency correlating to a switching frequency of the conversion filter. FIG. 4 further shows that the IR light source 41 is integrated into a front light assembly of the vehicle 40. The vehicle 40 further comprises a matching unit 43 and a display unit 42 for processing and viewing the image provided by the camera system 10.

The embodiments shown here are only examples of the present invention and must therefore not be understood as restrictive. Alternative embodiments considered by the skilled person are equally covered by the scope of protection of the present invention.

REFERENCE SIGNS

1 Detection system according to the present invention
10 Camera system
11 Image recording unit
12 Conversion filter
13 IR filter
14 Lens system
15 Aperture
16 Optical path
17 Lens
20 LED with IR filter
21 Anode layer
22 HBL
23 IR absorbing layer
24 HTL
25 EML
26 ETL
27 Cathode layer
30 RCCB
31 First segment
32 Second segment
33 Third segment
34 Fourth segment
40 Vehicle according to the present invention
41 Light source
42 Display
43 Image matching unit
50 Object
60 Driver

What is claimed is:

1. A detection system for vehicles adapted to record objects within a scenery at least in problematic viewing conditions, comprising:
a camera system establishing an optical path from a light entrance aperture via a lens system to an image recording unit with the image recording unit being adapted to record visible and IR light one or more of reflected or emitted from the scenery comprising at least one object;
an IR filter arranged within the optical path to block at least a first part of the IR light not being the at least one object related from reaching the image recording unit; and
a conversion filter arranged within the optical path to convert at least a second part of the IR light being the at least one object related to visible light of an image enhancing wavelength range,
wherein the lens system comprises at least one lens arranged in front of the image recording unit to guide the light from the scenery through the IR and conversion filters to the image recording unit;

wherein the conversion filter is a switchable filter in order to transmit the IR light to the image recording unit in an off state and to convert the IR light to the image enhancing wavelength range in an on state, and wherein the conversion filter is switched on and off with a ratio between the on and off durations varying between 1:1 and 1:4, the ratio of 1:1 being applied in twilight conditions, and the ratio increasing when viewing conditions improve.

2. The detection system according to claim 1, wherein the conversion filter is an up conversion layer structure converting the IR light into visible light of a certain wavelength comprising an IR absorbing layer followed by a stack of layers arranged between electrodes, with the conversion filter being adapted to be operated by a suitable operating voltage to enable the up conversion.

3. The detection system according to claim 1, wherein the IR filter is arranged on top of the image recording unit and the conversion filter is arranged on top of the IR filter, and the lens system is arranged in front of the set of image recording unit, the IR filter, and the conversion filter.

4. The detection system according to claim 1, wherein the conversion filter is arranged on top of the image recording unit, and the IR filter is arranged within the optical path in front of the conversion filter, with the IR filter having a transmission window of a certain widths outside the first part of the IR light in order to transmit the second part of the IR light to the conversion filter.

5. The detection system according to claim 4, wherein the IR filter is applied on top of at least one lens of the lens system or is arranged between the image recording unit and one lens of the lens system or between two lenses of the lens system.

6. The detection system according to claim 1, wherein the conversion filter and the IR filter are arranged in the optical path with the conversion filter being arranged in front of the IR filter along the optical path.

7. The detection system according to claim 6, wherein at least one of the IR filter or the conversion filter is applied on top of at least one lens of the lens system, or at least one of the IR filter or the conversion filter is arranged between two lenses of the lens system or between the image recording unit and one lens of the lens system.

8. The detection system according to claim 1, wherein the second part of the IR light comprises 1050 nm.

9. A detection system for vehicles adapted to record objects within a scenery at least in problematic viewing conditions, comprising:
   a camera system establishing an optical path from a light entrance aperture via a lens system to an image recording unit with the image recording unit being adapted to record visible and IR light one or more of reflected or emitted from the scenery comprising at least one object;
   an IR filter arranged within the optical path to block at least a first part of the IR light not being the at least one object related from reaching the image recording unit and
   a conversion filter arranged within the optical path to convert at least a second part of the IR light being the at least one object related to visible light of an image enhancing wavelength range,
   wherein the lens system comprises at least one lens arranged in front of the image recording unit to guide the light from the scenery through the IR and conversion filters to the image recording unit;
   wherein the visible light is divided into a first, a second and a third wavelength range, and the image recording unit comprises at least three segments, with a first segment being adapted to record only the first wavelength range of the visible light, a second segment being adapted to record only the second wavelength range of the visible light, and the third segment being adapted to record all wavelength ranges of the visible light, with the image enhancing wavelength range being within the third wavelength range, and
   wherein the image recording unit is adapted to record the first wavelength range of the visible light of the first segment and the second wavelength range of the visible light with the second segment, and
   a sum of the wavelength ranges including the first and second wavelength ranges and additionally the third wavelength range with at least the third segment, with a difference between the intensities of the third segment minus the intensities of the first and second segment resulting in intensity of visible light in the third wavelength range in the off-state of the conversion filter or in the sum of the intensities of the third wavelength range provided by the object and provided by the conversion filter.

10. The detection system according to claim 9, wherein at least one of:
   the different segments of the image recording unit have same sizes,
   the image recording unit comprises four rectangular segments arranged in a 2×2 array, or the first and second segments as well as the third segment and a fourth segment are diagonally arranged, and the third and fourth segments are identical segments.

11. A detection system for vehicles adapted to record objects within a scenery at least in problematic viewing conditions, comprising:
   a camera system establishing an optical path from a light entrance aperture via a lens system to an image recording unit with the image recording unit being adapted to record visible and IR light one or more of reflected or emitted from the scenery comprising at least one object;
   an IR filter arranged within the optical path to block at least a first part of the IR light not being the at least one object related from reaching the image recording unit;
   a conversion filter arranged within the optical path to convert at least a second part of the IR light being the at least one object related to visible light of an image enhancing wavelength range; and
   an image matching unit adapted to compare the images recorded in an on state of the conversion filter with images recorded in an off state of the conversion filter, with critical objects being distinguished from non-critical objects or identified by comparing a contrast between both images, with objects moving relative to a moving direction of the vehicle showing less contrast in the image with the off state of the conversion filter when being compared;
   wherein the lens system comprises at least one lens arranged in front of the image recording unit to guide the light from the scenery through the IR and conversion filters to the image recording unit.

12. The detection system according to claim 11, wherein the image matching unit transfers the identified objects to the visible image in order to at least one of tag the critical objects or to inform a viewer about present critical objects.

13. The detection system according to claim 12, wherein the image matching unit further displays a frame around each of the tagged objects to enhance the present critical object in the visible image.

* * * * *